Jan. 6, 1925.
W. S. WEST
ACCELERATOR
Filed May 12, 1924
1,522,401
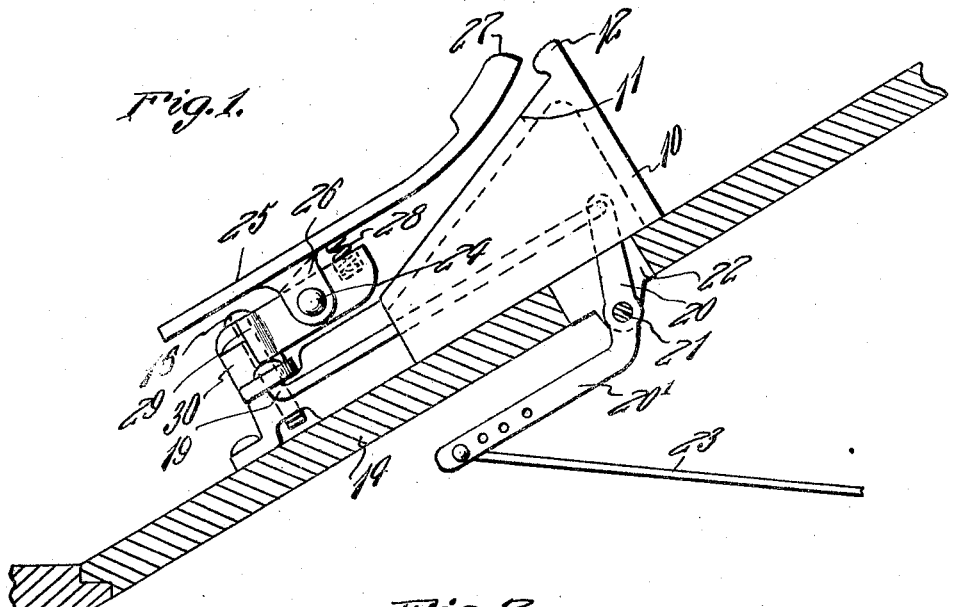
Fig. 1.
Fig. 2.
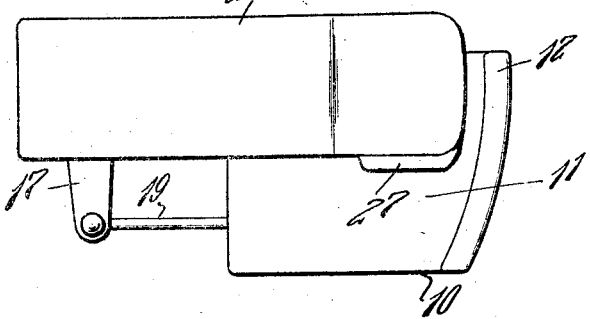
Fig. 3.
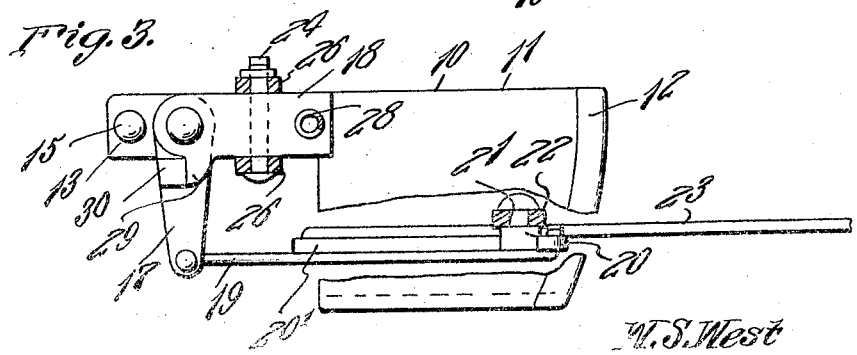
W. S. West
INVENTOR
BY Victor J. Evans
ATTORNEY
WITNESS:

Patented Jan. 6, 1925.

1,522,401

UNITED STATES PATENT OFFICE.

WILLIAM S. WEST, OF MIDDLEBURG, NEW YORK.

ACCELERATOR.

Application filed May 12, 1924. Serial No. 712,794.

*To all whom it may concern:*

Be it known that I, WILLIAM S. WEST, a citizen of the United States, residing at Middleburg, in the county of Schoharie and State of New York, have invented new and useful Improvements in Accelerators, of which the following is a specification.

This invention relates to foot accelerators for motor operated vehicles, and contemplates a structure including a pedal mounted for lateral movement to actuate the throttle valve in contra-distinction to the vertical movement of accelerator pedals in present day use, the object of the invention being to eliminate sudden jerks and bounds of the car when the latter is travelling over irregular surface which frequently causes the foot of the operator to casually depress the accelerator pedal.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing the accelerator in side elevation mounted upon the foot board of a vehicle, Figure 2 is a top plan view, Figure 3 is a view similar to Figure 2 with the pedal removed and the base partly broken away.

The accelerator forming the subject matter of the present invention comprises a base 10 which is preferably of the contour shown in the drawing, and wherein it will be noted that the upper surface of the base is inclined as at 11 to serve as a foot rest or support for the operator of the vehicle, while rising from one end of the base is a toe engaging flange 12 which is slidably curved as shown in Figures 2 and 3, this flange serving to guide the foot of the operator in the operation of the accelerator. Projecting from the other end of the base 10 and preferably forming an integral part thereof, is an elongated extension 13 which reposes upon the floor board 14 of the vehicle, and secured thereto by a suitable fastening element 15. Rising from this extension 13 is a pivot bolt or rod 16 upon which is mounted a pair of right angularly disposed pivoted members indicated at 17 and 18 respectively. Terminally connected with the member 17 is an operating rod 19 which passes through the base 10, and connected with the adjacent branch 20 of a bell crank lever fulcrumed as at 21 directly beneath the floor board 14. This branch 20 projects upwardly through an opening 22 in the floor board and enters the base 10, which is hollow to permit of the arrangement of parts shown and described. The other branch 20 of the lever has terminally connected thereto a valve operated rod 23.

Arranged transversely of and supported by the other pivoted member 18 is a bolt 24, upon which is pivoted a foot pedal 25. Depending from the side of this pedal are spaced apertured ears 26 which straddle the member 18, and utilized to pivotally support the pedal 25 upon the bolt 24. This pedal has a portion of its length arranged directly above the base 10 and is formed at one side with a lip or extension 27 to be engaged by the side of the foot of the operator, so that the pedal can be conveniently moved laterally when it is desired to control the throttle valve. Interposed between the pedal 25 and the member 18 is a coil spring 28 which normally holds the pedal 25 slightly spaced from the foot rest as shown in Figure 1, but when the foot of the operator is placed upon this pedal, it can be easily depressed so that the foot is allowed to bear against the surface 11 of the base, with the toe of the shoe engaging the flange 12. It will now be noted that the member 18 is formed with a lug or shoulder 29 which in the normal position of the member 18 engages a similar lug 30 carried by the pivoted member 17. Consequently when the pedal 25 is swung from its normal position shown in Figure 2, laterally and in the direction of the right, the member 18 is moved upon the pivot rod 16 in the same direction, and as the shoulder 29 of the member 18 engages the shoulder 30 of the member 17, this member is simultaneously moved with the member 18. During this operation the rod 19 is retracted to rock the bell crank lever above described, this lever in turn actuating the valve rod 23 to open the throttle valve. When the pedal 25 is relieved of the pressure utilized to shift the pedal to the right, the usual valve spring not shown functions to return the parts of the accelerator to normal position.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A foot accelerator comprising a base, a pivot rod rising therefrom, a pair of right angularly disposed separable members pivoted on said rod, a pedal pivotally and yieldably supported on one of said members and extended over said base, said pedal and its supporting member as a unit being adapted to be moved laterally on said rod, means whereby both of said members are simultaneously moved in the same direction, and a valve connection associated with the other of said pivoted members.

2. A foot accelerator comprising a base designed to constitute a foot rest, a pivot rod rising from said base, a pair of right angularly disposed separable members pivoted on said rod, a pedal pivoted and yieldably supported on one of said members and overlying said base, a lip formed at one side of the pedal, whereby the latter and said member can be moved laterally on said rod, co-operating means carried by the respective members whereby both move simultaneously in one direction, and a valve connection associated with the other member for the purpose specified.

In testimony whereof I affix my signature.

WILLIAM S. WEST.